US012530525B1

(12) United States Patent
Genc et al.

(10) Patent No.: US 12,530,525 B1
(45) Date of Patent: Jan. 20, 2026

(54) AUTOCOMPLETE WITH DEEP RETRIEVAL REINFORCEMENT LEARNING

(71) Applicant: Amazon Technologies, Inc., Seattle, WA (US)

(72) Inventors: Sahika Genc, Hayden, ID (US); Rohit Dilip Patki, Mountain View, CA (US); Sravan Babu Bodapati, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 18/477,921

(22) Filed: Sep. 29, 2023

(51) Int. Cl.
*G06F 17/00* (2019.01)
*G06F 40/274* (2020.01)
*G06F 40/30* (2020.01)

(52) U.S. Cl.
CPC ............ *G06F 40/274* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 10,102,199 B2* | 10/2018 | Bailey | ................ | G06F 40/289 |
| 10,853,103 B2* | 12/2020 | Zhu | ................ | G06F 9/44505 |
| 11,106,690 B1* | 8/2021 | Dhillon | ................ | G06N 5/01 |
| 11,573,989 B2* | 2/2023 | Bailey | ................ | G06F 16/3329 |
| 11,625,436 B2* | 4/2023 | Kang | ................ | G06F 9/5027 |
| | | | | 707/765 |
| 2021/0192134 A1* | 6/2021 | Yue | ................ | G06F 3/04895 |
| 2022/0050877 A1* | 2/2022 | Kang | ................ | G06F 40/44 |
| 2023/0029420 A1* | 1/2023 | Rusnak | ................ | G06F 16/9535 |

OTHER PUBLICATIONS

"Hugging Face", OpenAI GPT2, Available Online at: https://huggingface.co/docs/transformers/community, Accessed from Internet on Oct. 24, 2023, pp. 1-40.

Bohm et al., "Better Rewards Yield Better Summaries: Learning to Summarise Without References," Proceedings of the 2019 Conference on Empirical Methods in Natural Language Processing and the 9th International Joint Conference on Natural Language Processing (EMNLP-IJCNLP), Sep. 3, 2019, 11 pages.

(Continued)

*Primary Examiner* — Satwant K Singh
(74) *Attorney, Agent, or Firm* — Kilpatrick Townsend & Stockton LLP

(57) ABSTRACT

Techniques are described herein for generating an autocomplete query. An example method includes a system receiving, via graphical user interface (GUI) at a first device, a first prefix. The system can generate, via a first language model, a first autocomplete query associated with an item based at least in part on the first prefix. The system can determine a non-user based input for a reward model. The system can generate a reward for the first language model based at least in part on the non-user based input. The system can cause a change of weights of the first language model based at least in part on the reward. The system can receive, via a second GUI at a second device, the first autocomplete prefix. The system can generate a second autocomplete query based at least in part on the first autocomplete prefix and the change of weights.

20 Claims, 11 Drawing Sheets

(56) References Cited

OTHER PUBLICATIONS

Cai et al., "A Survey of Query Auto Completion in Information Retrieval," Foundations and Trends in Information Retrieval, vol. 10, No. 4, Sep. 19, 2016, 95 pages.

De Cao et al., "Autoregressive Entity Retrieval," International Conference on Learning Representations (ICLR), Mar. 24, 2021, pp. 1-20.

Devlin et al., "BERT: Pre-Training of Deep Bidirectional Transformers for Language Understanding," Available online at: https://arxiv.org/pdf/1810.04805.pdf, May 24, 2019, 16 pages.

Hyvonen et al., "Semantic Autocompletion," Lecture Notes in Computer Science, vol. 4185, Sep. 3-7, 2006, pp. 1-13.

Lee et al., "Improving Text Auto-Completion with Next Phrase Prediction," Available Online at: https://aclanthology.org/2021.findings-emnlp.378.pdf, Sep. 15, 2021, 5 pages.

Leike et al., "Scalable Agent Alignment via Reward Modeling: A Research Direction," Available Online at: https://users.cs.utah.edu/~dsbrown/readings/scalable_alignment_direction.pdf, Nov. 19, 2018, pp. 1-30.

Leviathan et al., "Fast Inference from Transformers via Speculative Decoding," Proceedings of Machine Learning Research, vol. 202, May 18, 2023, pp. 1-13.

Li et al., "Competition-Level Code Generation with AlphaCode," Science, vol. 378, No. 6624, Feb. 8, 2022, pp. 1-74.

Luo et al., "BioGPT: Generative Pre-trained Transformer for Biomedical Text Generation and Mining," Briefings in Bioinformatics, vol. 23, No. 8, Sep. 24, 2022, pp. 1-12.

Min et al., "Rethinking the Role of Demonstrations: What Makes In-Context Learning Work?," Association for Computational Linguistics, Available Online at: https://openreview.net/pdf?id=cnRGMv-Ak7u, Oct. 20, 2022, 19 pages.

Modi et al., "E-mail Autocomplete Function Using RNN Encoder-decoder Sequence-to-sequence Model," Institute of Electrical and Electronics Engineers (IEEE), Available Online at: https://ieeexplore.ieee.org/document/9675961, Accessed from Internet on Oct. 25, 20232023, pp. 1-2.

Ouyang et al., "Training Language Models to Follow Instructions with Human Feedback," Computation and Language, Available Online at: https://doi.org/10.48550/arXiv.2203.02155, Mar. 4, 2022, 68 pages.

Park et al., "A Neural Language Model for Query Auto-Completion," Available Online at: https://doi.org/10.1145/3077136.3080758, Aug. 2017, pp. 1189-1192.

Radford et al., "Language Models are Unsupervised Multitask Learners," Available Online at: https://d4mucfpksywv.cloudfront.net/better-language-models/language_models_are_unsupervised_multitask_learners.pdf, Mar. 2019, 24 pages.

Rubin et al., "Learning to Retrieve Prompts for in-context Learning," Available Online at: https://arxiv.org/abs/2112.08633, 2021, 17 pages.

Sanh et al., "DistilBERT, a Distilled Version of BERT: Smaller, Faster, Cheaper and Lighter," Available Online at: https://arxiv.org/abs/1910.01108, 2019, 5 pages.

Santhanam et al., "ColBERTv2: Effective and Efficient Retrieval via Lightweight Late Interaction," Available Online at: https://arxiv.org/abs/2112.01488, 2022, 20 pages.

Schulman et al., "Proximal Policy Optimization Algorithms," Available Online at: https://arxiv.org/pdf/1707.06347.pdf, Aug. 28, 2017, pp. 1-12.

Sordoni et al., "A Hierarchical Recurrent Encoder-decoder for Generative Context-aware Query Suggestion," Available Online at: https://arxiv.org/abs/1507.02221, 2015, 10 pages.

Stiennon et al., "Learning to Summarize From Human Feedback," Available Online at: https://arxiv.org/abs/2009.01325x, 2022, 45 pages.

Svyatkovskiy et al., "Intellicode Compose: Code Generation Using Transformer," Available Online at: https://arxiv.org/abs/2005.08025, 2020, pp. 1433-1443.

Werra et al., "TRL: Transformer Reinforcement Learning," Available Online at: https://github.com/lvwerra/trl, 2020, pp. 1-6.

Xiao et al., "SmoothQuant: Accurate and Efficient Post-Training Quantization for Large Language Models," Available Online at: https://arxiv.org/abs/2211.10438, 2023, pp. 1-13.

Xie et al., "An Explanation of in-context Learning as Implicit Bayesian Inference," Available Online at: https://arxiv.org/abs/2111.02080, 2021, 31 pages.

Ziegler et al., "Fine-Tuning Language Models from Human Preferences," OpenAI, Available Online at: https://arxiv.org/pdf/1909.08593.pdf, Jan. 8, 2020, 26 pages.

Kossen, et al., "In-Context Learning in Large Language Models Learns Label Relationships but Is Not Conventional Learning," 2023, Available online at: https://arxiv.org/abs/2307.12375, 69 pages.

* cited by examiner

"Please use the following samples as reference for solving the problem: \
[sample 1] Generate the Product autocomplete suggestions with this prefix: tablet→ tablet 9.7inch case \
[sample 2] Generate the Product Autocomplete suggestions with the prefix: pet toy → pet toy for dogs \
[sample 3] Generate the Product Autocomplete suggestions with the prefix: batteries→ batters aa and aaa \
Now solve the following problem \n
current_str = "Generate the Product autocomplete suggestions with this prefix: "current_prefix +" → "
encoded_input_str = in_context_learning_prefix + current_str

"given these past queries: camera for hike, photography, travel images. Generate the Product Autocomplete suggestions with the prefix: nik".

FIG. 5

AUTOCOMPLETE WITH DEEP RETRIEVAL REINFORCEMENT LEARNING

BACKGROUND

Autocomplete is a computing feature that can be used in conjunction with a search feature of a website or application, such as a word processing application. The autocomplete feature can be configured to determine a word based on the first letter of the word typed by a user. If the autocomplete feature has correctly determined the word, the user can use the autocomplete feature to complete the word.

BRIEF DESCRIPTION OF THE DRAWINGS

Various embodiments in accordance with the present disclosure will be described with reference to the drawings, in which:

FIG. 4 illustrates an example prompt for deep retrieval reinforcement learning, according to embodiments of the present disclosure.

FIG. 5 illustrates an example prompt for deep retrieval reinforcement learning, according to embodiments of the present disclosure.

DETAILED DESCRIPTION

Figure 1:
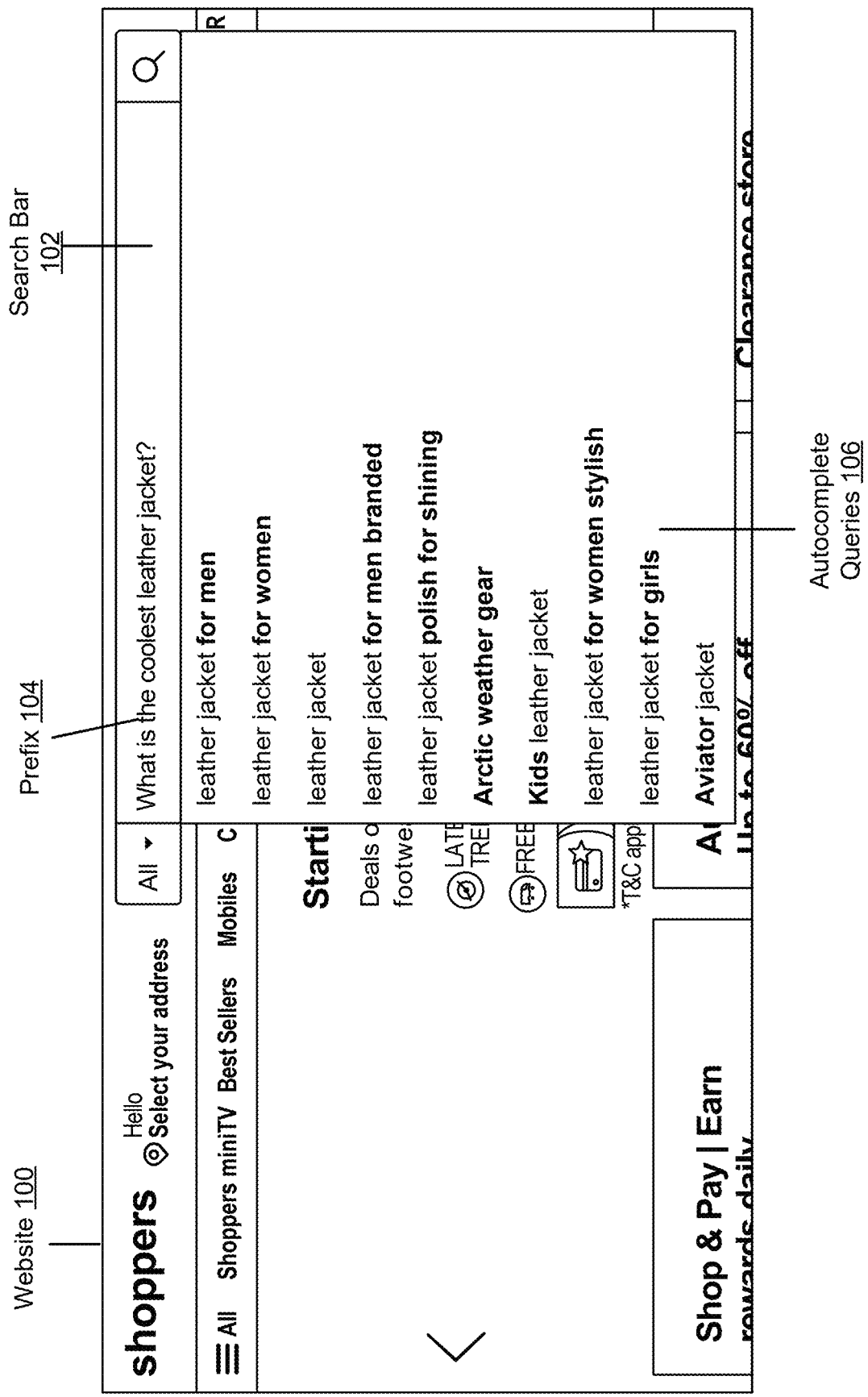
FIG. 1 illustrates an example graphical user interface (GUI) for autocomplete with deep retrieval reinforcement learning, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, generating an autocomplete query using reinforcement learning. A conventional computing system can detect user input at a search bar or text field indicating that a user has begun typing a query (e.g., a prefix) into the search bar or text field and further use lexical matching to assist the user with completing the query. For example, if the user types the prefix "Acme car," the conventional computing system can return the autocomplete query "Acme car model A accessories," "Acme car floor mats," or "Acme car accessories." Recently, user behavior has begun to shift from entering a short prefix to entering a longer prefix with more advanced semantic and lexical components. For example, rather than the user typing a categorical prefix, such as "Acme car," a user can type a natural language prefix, "In winter, what types of Acme car accessories should I have?" Conventional techniques, such as relying solely on lexical matching are ill-equipped to generate an autocomplete query based on a longer prefix.

As described herein, a computing system can receive a user input indicating a prefix that has been entered into a search feature (e.g., a search bar) displayed on a graphical user interface (GUI). The computing system can further use a large language model that has been trained using reinforcement learning to generate and rank an autocomplete query. The computing system can then return the autocomplete query to be displayed on the GUI. In some instances, the computing system can return multiple autocomplete queries. User input can be subsequently received indicating a selection of one of the autocomplete queries.

The computing system can further be trained to return the autocomplete query directed to a particular domain. For example, a website can provide a search bar to permit a user to request information for an item that is available through the website. The computing system can be trained to return an autocomplete query that relates to the item that is offered on the website. In particular, the system can receive a natural language prefix (e.g., "In winter, what types of Acme car accessories should I have?") or a categorical prefix (e.g., Acme car, luxury car) and generate an autocomplete query from each prefix, where the autocomplete query relates to an item available via the website. Therefore, in addition to a traditional categorical prefix, the computing system can also be trained to return an autocomplete query from a natural language prefix. In the instance that the herein described autocomplete feature is not used for a website that offers items (e.g., a word processing application, a website that permits textual input), the language model can be trained for that domain. For example, if the autocomplete feature is used on for a website dedicated to movies, the language model can be trained on a corpus of movie data, such that the generated autocomplete query relates to movies. If the autocomplete feature is used for a word processing application, the autocomplete feature can be trained for various domains (e.g., engineering documents, business analysis, historical analysis, and other appropriate domain). In addition to a word processing application, the techniques described herein can be used for other uses, such as autocompleting text in an electronic mail application. For example, a language model can be trained based on a particular domain (e.g., business writing, technical writing, personal writing). Furthermore, reinforcement learning with human feedback can be used to further train the language model to generate desired autocomplete text. In other words, the techniques described herein can be applied to more than autocomplete for a website that offers items.

A large language model (LLM) can be trained to receive a prefix as an input and output an autocomplete query. Once the LLM is trained to output the autocomplete query, the LLM can be fine-tuned using reinforcement learning. A reward (positive or negative) that is used to fine-tune the LLM can be based on a user-based input or a nonuser-based input. The user-based input can be, for example, based on whether the user clicks on the autocomplete query. The nonuser-based input can be, for example, a rate of use (e.g., an aggregated rate of use amongst all users) of the autocomplete query, whether the autocomplete query is directed towards an item offered on the website, whether the autocomplete queries is similar to a past query, or other appropriate non-user based input. The reward values can be based on various states reached upon presenting the autocomplete query on the GUI. For example, the highest positive reward can be based on whether the user purchased the item associated with the autocomplete query. A next highest positive reward can be based on whether the user clicked on the autocomplete query.

The computing system can further determine a reward based on the generated autocomplete query. For example, the computing system can determine an interaction with autocomplete query. The computing system can further map the interaction to a reward. The computing system can further adjust the weights of the model to maximize the reward for a subsequent autocomplete query for a subsequent prefix. In particular, the model can use the information with respect to the generated autocomplete query and associated reward to generate the subsequent autocomplete query with a maximized reward.

In the event that that computing system generates multiple autocomplete queries, the rewards can be used the rewards as a ranking system. Furthermore, the placement of each autocomplete query as displayed on the GUI can be based on the ranking.

Embodiments of the present disclosure provide several technical advantages over conventional search result generation techniques. The computing system (e.g., agent) can use a reinforcement learning technique to learn to take an action (e.g., generate autocomplete query) and receive feedback from an environment (e.g., GUI). Therefore, unlike a conventional autocomplete system, the herein described computing system can use a generative machine learning model to generate an autocomplete query that is responsive to the user's intent. This is different than a conventional computing system, in which the system maps keywords in a prefix to a database of autocomplete responses. The conventional autocomplete system cannot adequately generate an autocomplete queries, in instances that the prefix is a natural language prefix with more advanced semantic and lexical components. As the herein described computing system is deployed, the system can semantically analyze a natural language prefix to determine the intent of the user. The computing system can experiment to generate an autocomplete query. The computing system can cause the autocomplete query to be displayed on the GUI, and monitor a user's interaction with the autocomplete query. The computing system can then refine its process to generate a subsequently generated autocomplete query. Therefore, another advantage is rather than having hardcoded rules for associating a prefix with an autocomplete query, the herein described system can use a machine learning model to adapt to changing user preferences.

The herein described techniques provide technical advantages. One technical advantage is that the herein described techniques can use a language model to generate an autocomplete query that is more accurate in relation to a particular domain. As the techniques result in more accurate results, less user input is needed. Furthermore, as less input is needed for the language model, the system can more rapidly generate a query.

FIG. 1 illustrates an example graphical user interface (GUI) for autocomplete with deep retrieval reinforcement learning, according to embodiments of the present disclosure. As illustrated, a website 100 is displayed on a GUI that includes a search bar 102 for entering a prefix 104. The search query can be inputted manually using a peripheral device, such as a keyboard, audible using a voice command, or other appropriate method. As illustrated, the prefix includes a complete sentence, "What is the coolest leather jacket?" It should be appreciated that a letters, group of letters, word, or group of words can be considered the prefix. For example, the prefix can be any one of, for example, "What," "What is," "What is the," "What is the coolest," "What is the coolest leather," and "What is the coolest leather jacket?" Furthermore, the herein described computing system can iteratively generate autocomplete query after each of the above prefixes is entered into the search bar 102. The prefix 104 can be received by the computing system via the GUI. The computing system can use a language processing technique to semantically understand the prefix 104 and any item or item class that the prefix 104 is directed towards. The computing system can then use a generative model to generate autocomplete queries 106. As illustrated, each of the autocomplete queries relates to a leather jacket. The prefix 104 did not specify any characteristics for the user, and therefore the computing system has generated a variety of candidate leather jacket autocomplete queries. As illustrated, the computing system has generated, "leather jackets for men," leather jackets for women, and kids leather jacket."

Unlike conventional autocomplete systems that match keywords in a search query with target words, the herein described computing system can generate an autocomplete query using an LLM. The LLM can be a machine learning model implemented via a neural network that has a transformer architecture. In some instances, the LLM can receive the prefix 104 and engage in a process of tokenization, or break up the prefix 104 into smaller words or phrases (e.g., tokens). The LLM can then convert each token into a multi-dimensional vector. The LLM can then process each token to determine the semantic meaning of each token. The LLM can further apply an attention score, which describes a relationship between each token and each other token. The attention score permits the LLM to analyze the relationship between all of the tokens. The LLM can then use a probability distribution to select one or more tokens to form the autocomplete query (e.g., "leather jackets for men," leather jackets for women, and kids leather jacket."), where each token is selected based on a previous token. The computing system can then cause the autocomplete query to be displayed on a GUI as illustrated in FIG. 1. The user can view the autocomplete query via the GUI. As indicated above, as illustrated in FIG. 1, the computing system can cause multiple ranked autocomplete queries to be displayed via the GUI. The user can interact with the GUI and select one of the autocomplete queries. For example, the user can select "arctic weather gear" from the list of autocomplete queries. The computing system can transmit the selection to a search engine, which can return information associated with the item. The computing system can further cause information associated with "arctic weather gear" items to be displayed on the GUI based on the user's selection.

Figure 2:
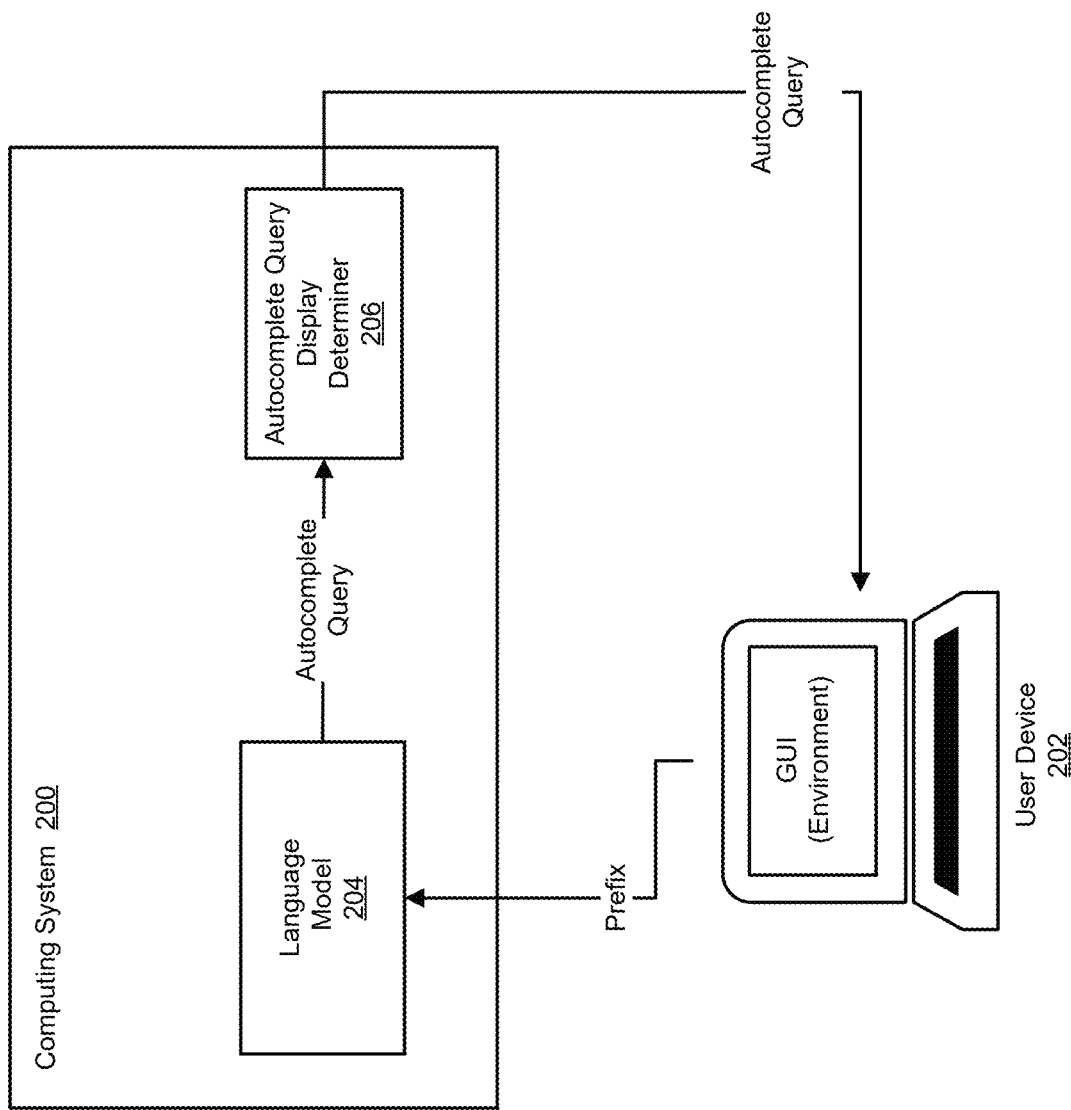
FIG. 2 illustrates an example system for autocomplete with deep retrieval reinforcement learning, according to embodiments of the present disclosure.

FIG. 2 illustrates an example system for autocomplete with deep retrieval reinforcement learning, according to embodiments of the present disclosure. The computing system 200 can be in operable communication with a user device 202. The computing device can be logged into the internet and access a website. The website can provide a GUI that includes a search feature (e.g., a search bar) for searching for website content. The user can use the user device 202 to enter a prefix into the search feature, which is transmitted to a language model 204. The language model 204 can be an LLM that is implemented by a neural network. The neural network can include a transformer architecture, which is configured to receive a textual input (e.g., a prefix), and output an autocomplete query. In particular, the language model 204 can include various language models, such as a generative pre-trained transformer (GPT) or a bi-directional representation from transformers (BERT). GPT includes an autoregressive language model that generally considers content to the left of a word to determine the context. For example, when considering the context of the word "coolest" of the prefix "What is the coolest leather jacket?", the GPT model considers the words "What," "is," and "the." On the other hand, the BERT model includes a bi-directional model that considers content to the left and right of a word to determine the content. For example, when considering the context of the word "coolest" of the prefix "What is the coolest leather jacket?" the GPT model considers the words "What," "is," "the," "leather," and 'jacket." Both the GPT model and the BERT model use transformer architecture that can learn the context of a prefix using attention mechanisms. Both the GPT model and the BERT model can use the learned context of the prefix to output an autocomplete query.

The language model 204 can transmit the autocomplete query to the autocomplete query display determiner 206, which can determine how the autocomplete query is to be displayed. In the instances that the language model outputs multiple autocomplete queries, the autocomplete query display determiner 206 can rank the autocomplete queries. The autocomplete query display determiner 206 can further position each autocomplete query based on the ranking. For example, referring back to FIG. 1, the computing system can position the autocomplete query "leather jacket for men" at the top of the list based on a ranking. The autocomplete query display determiner 206 can generate control instructions as to the autocomplete query and how to display the autocomplete query and can cause the autocomplete query to be displayed on the user device GUI (e.g., as illustrated in FIG. 1). The computing system 200 can observe any interaction the user has with the autocomplete query to determine a state. For example, the user may not interact with the autocomplete query. For example, the user may continue manually adding to the prefix and use the user generated query. In another example, the user may click on the autocomplete query. In response to the clicking on the autocomplete query, the computing system 200 can cause information associated with an item that matches the autocomplete query to be displayed on the GUI. In this instance, the computing system 200 can continue to observe and determine whether the user purchases the item.

Figure 3:
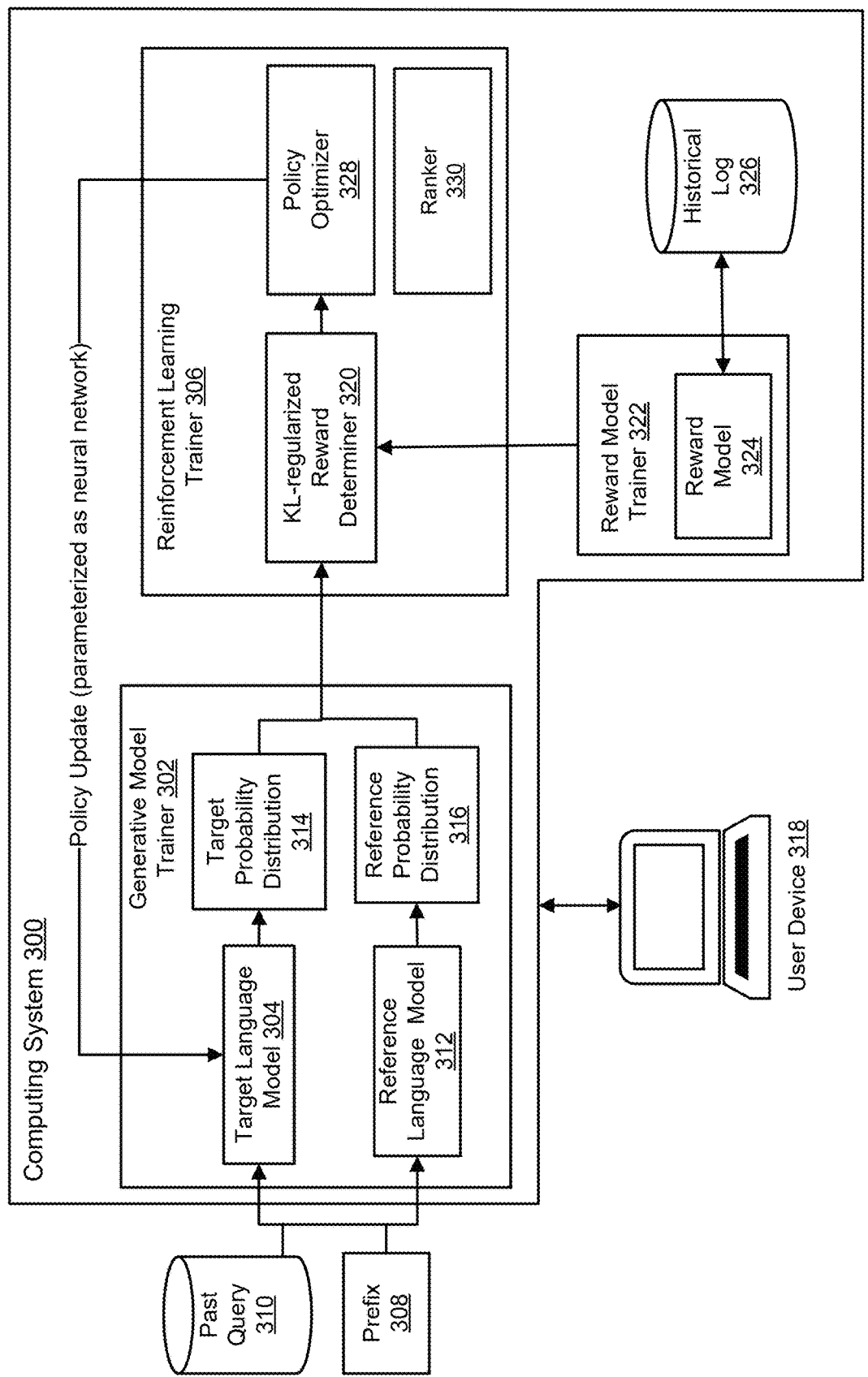
FIG. 3 is an illustration of an example computing system for training a language model, according to embodiments of the present disclosure.

FIG. 3 is an illustration of an example computing system 300 for training a language model, according to embodiments of the present disclosure. The training techniques described herein can rely on neural combinatorial optimization, in which a neural network, such as a language model and reinforcement learning can be used for generating an autocomplete query. Reinforcement learning can be used to define the environment (e.g., a universe of GUIs displaying autocomplete queries) and an agent (e.g., a computing system that employs a language model guided by a policy). One training approach can include using reinforcement learning pretraining in which a training data, including a prefix and a past query can be used to fine tune a language model, such as a transformer model. The language model can learn to express a policy over solutions based on rewards.

The language model can generate an autocomplete query through various methods. For example, the target language model 304 can receive the prefix 306 and tokenize the prefix 306. Tokenization is a process in which the target language model 304 can break up the prefix 306 into smaller words or phrases (e.g., tokens). The target language model 304 can then encode the tokens by converting each token into a multi-dimensional vector. The target language model 304 can then process each token to determine the semantic meaning of each token. The target language model 304 can further apply an attention score which describes a relationship between each token and each other token. The attention score permits the target language model 304 to analyze the relationship between all of the tokens. The target language model can then use a determine a probability distribution to determine a next token for the autocomplete query, where each token is selected based on a previous token. The computing system 300 can then cause the autocomplete query to be displayed on a GUI of the user device 318.

The target language model 304 can learn which actions yield the maximum reward by calculating policy gradients. One approach for determining the policy gradient is a proximal policy optimization (PPO). Using PPO, the target language model 304 can calculate an update to the policy gradient that minimizes a cost function and seek to keep a deviation from a previous policy relatively small. By keeping the deviation in policy relatively small, PPO maintains a low variance in policy and helps simplify the training process. As described herein, the PPO can further be coupled with a Kullbeck-Leibler (KL) penalty.

As illustrated, a computing system can use a generative model trainer 302 to train a language learning model 304, using reinforcement learning 306, to generate an autocomplete query based on a prefix. The computing system can provide a prefix 308 and past query 310 from a past query database to the generative model trainer 302, and in particular to a target language model 304 and a reference language learning model 312. The prefix 308 can be, for example, "Acme car." The past query 310 can be a query in the form of a prompt that has been selected in the past to be transmitted to a search engine. From time to time, a user may engage in a session to search for one or more item on the website. The user can enter a first prefix and the computing system 300 can return a first autocomplete query based on the first prefix. If the user selected the first autocomplete query, then the selected first autocomplete query can be stored in the past query database 310. During the same session, the user may enter a second prefix. The target language model 304 and the reference language model 312 can use the first autocomplete query to generate a second autocomplete query in response to the second prefix. For example, during a session, the user entered the first prefix camera and the computing system 300 can return the autocomplete query, "Nikalt camera," which the user selects. During the same session, the user can enter the second prefix "camera lens" and the target language model 304 can use the selected first autocomplete query to return the second autocomplete query "Nikalt camera lens".

The target language model 304 can be the model that is to be trained for generation of an autocomplete query. The reference language model 312 can be a model that has previously been trained to generate an autocomplete query and that provides a baseline for comparing the output of the target language model 304.

Each of the target language model 304 and the reference language model 310 can be pre-trained using a domain-specific corpus. For example, as indicated above the target language model 304 can be set to be used by a website that offers items and services. The entity associated with the website can have stored a corpus of autocomplete queries related to items and services offered through the website. The target language model 304 and the reference language model 310 can be fine-tuned to output responses based on the corpus of autocomplete queries. In this sense, the target language model 304 and the reference language model 310 outputs related to items and services offered on the website. Training the target language model 304 and the reference language model 310 to output a response in the form of an automated query that is associated with items and services offered on the website can be performed via additional fine-tuning of the models.

Based on the prefix 308 and the past query 310, the target language learning model 304 can generate one or more autocomplete queries. The target language learning model 304 can further output a target probability distribution 314 for the one or more autocomplete queries. Based on the prefix 308 and the past query 310, the reference language model 304 can generate one or more autocomplete queries. The reference language model 304 can further output a reference probability distribution 316 for the one or more autocomplete queries. The generative model trainer 302 can transmit each of the target probability distribution 314 and the reference probability distribution 316 to the reinforcement learning trainer 306, and in particular to the KL regularized reward determiner 318.

In some instances, the target language model 304 can be provided a past query in the form of a prompt for in-context learning, or sometimes known as prompt engineering. In-context learning permits the target language model 304 to learn a new task by providing the target language model 304 with a prompt. The prompt is a natural language text that describes the task (e.g., generate an autocomplete query based on a prefix) that the target language model 304 is to perform. The prompt can provide the target language model 304 a demonstration of an input-output (e.g., prefix-autocomplete query) pair that the target language model 304 can use to learn to generate a prefix-based autocomplete query.

In addition, the generative model trainer 302 can transmit the prefix 308, the autocomplete query (e.g., "Acme car model A accessories"), generated by the target language model 304, and a state (e.g., user accepted, user did not accept) to a user device 318. The user device 318 can include a computing device that is operable to display a GUI. For example, the GUI can be associated with the website 100 of FIG. 1. In some instances, a user using the user device 318 inputted the prefix 306 into the user device 318, and the prefix 306 is transmitted to the generative model trainer 300 for training purposes. The user can interact with the GUI in various manners. For example, the user can ignore the autocomplete query generated by the target language model 304, the user can select the autocomplete query, or the user can modify the autocomplete query. A modification of the autocomplete query can the manual changing the autocomplete query, for example, changing the autocomplete query from "Brand A barbeque grill" to "Brand B barbeque grill." If the user either selects the autocomplete query or modifies the autocomplete query, the computing system 300 can transmit the autocomplete query to a search engine to return an item associated with the autocomplete query. The computing system can continue to observe the interactions of the user and the GUI. For example, the computing system 300 can observe as to whether the user clicked on the returned item to obtain more information about the item. The computing system 300 can further observe as to whether user interacted with the GUI to indicate an intention to obtain the item.

The computing system 300 can observe the interaction of the user and the GUI, and report a state to the reward model trainer 322. The reward model trainer 322 can use the prefix 306, the autocomplete query, and the state to train a reward model 320 to use a reward function to map the combination of the prefix 306, the autocomplete query, and the state to determine a reward.

The reward model 324 can map each autocomplete query with a reward based on the state (e.g., user clicked on the autocomplete query, user did not click on the auto complete query, user entered an input indicating an intent to obtain an item, user did not enter an input indicating an intent to obtain the item. The reward model trainer 322 can further access a historical log database 326, which includes, for example, information regarding the rate of use of an autocomplete query, autocomplete query that has been selected by a user, a user update of an autocomplete query. For example, the reward model can map "arctic weather gear" to a positive reward based on the user selecting the autocomplete query. The reward model 324 can further map "leather jackets for men" to a negative reward based on the user not selecting the autocomplete query. In other words, the reward can be based on a user based input (e.g., whether the user clicked on the autocomplete query) and non-user-based inputs (e.g., the information included in the historical log database 326. The reward can be in the form of a logit, which is a raw, unnormalized score generated by the reward model's output layer. The reward model 324 can transmit the reward to the KL-regularized reward determiner 316.

The KL-regularized reward determiner 316 can measure how the target probability distribution 312 differs from the reference probability distribution 314. In other words, the KL divergence can be a measure of the relative entropy between the target probability distribution 312 and the reference probability distribution 314. In some instances, the KL divergence between the target probability distribution 312 and the reference probability distribution 314 can be described as:

$$KL(P\|Q)=\Sigma P(x)\log(P(x)/Q(x)),$$

where P is the target probability distribution 312, Q is the reference probability distribution 314, $P(x)$ and $Q(x)$ are the probabilities of observing autocomplete query x. The KL divergence is 0 is P and Q are identical. It should be appreciated that techniques other than KL divergence can be used to measure the relative entropy between the target probability distribution 312 and the reference probability distribution 314. For example, computing system could use a method based on, for example, a Jensen-Shannon divergence, s Stein divergence, a Bhattacharyya distance, a total variation distance, or other appropriate technique.

The KL-regularized reward determiner 316 can be use the KL divergence to compare the performance of the target language model. For example, the lower the KL divergence the better the performance of the target language model 302. The KL divergence can further assist with generative models, such as the target language model 302. The lower the KL divergence, the more the target probability distribution 312 resembles the reference probability distribution 314, and the more an autocomplete query generated by the target language learning model 302 resembles an autocomplete query generated by the reference language model 312 based on the same prefix. In other words, the better the target language model 302 is at generating an autocomplete query. The KL divergence permits the reinforcement learning trainer 304 to evaluate similarities and differences between an autocomplete query generated by the target language model 302 and an autocomplete query generated by the reference language model 312.

The KL-regularized reward determiner 316 can assign a reward based on the KL divergence. For example, the KL-regularized reward determiner 316 can use a proximal policy optimization (PPO) with KL-penalty. PPO is a policy gradient method for reinforcement learning that can assist with ensuring that a policy update is not too large. A policy can be considered a mapping between an action (e.g., generating an autocomplete query) and a state (e.g., a user selected the autocomplete query). The target language model 304 may not initially understand which actions lead to which states, and consequently which rewards. Therefore, the target language model can determine a policy gradient. Using PPO, the reinforcement learning trainer 304 can calculate an update to the policy gradient that minimizes a cost function and seek to keep a deviation from a previous policy relatively small. By keeping the deviation in policy relatively small, PPO maintains a low variance in policy and helps simplify the training process.

As described herein, the variance can be based on the KL divergence between the target probability distribution 314 and the reference probability distribution 316. The KL-regularized reward determiner 318 can compare the determined KL divergence to a threshold KL divergence. If the determined KL divergence is greater than the threshold KL divergence, the KL-regularized reward determiner 318 can update the reward to reduce the reward. If the determined KL divergence is less than the threshold KL divergence, the KL-regularized reward determiner 318 can update the reward to increase the reward. By updating the reward, the KL-regularized reward determiner 318 can minimize overfitting and rewarding the target language model 304 from deviating too greatly from the reference language model 312.

The KL-regularized reward determiner 318 can transmit the reward information to the policy optimizer 328. The target language model's policy can be represented by a parameterized function, which can be used to describe the probability of taking an action that results in a particular state, where each state is associated with a reward. The policy optimizer 328 can update the policy parameters to maximize an expected reward. For example, the action and reward can be generating an autocomplete query that leads to a user indicating an intent to obtain an item associated with the autocomplete query, where the user indication to obtain the item is associated with the highest reward. The policy optimizer 328 can use various methods to optimize the policy, such as gradient descent.

In practical terms, the parameterized function can be implemented by a neural network (e.g., the target language model 304). Based on a first state of the environment (e.g., the user device 318), the target language model 304 generates an autocomplete query and transmits the autocomplete query to the user device 318. The user interacts with the GUI and the state of the environment changes from a first state to a second state (e.g., the user has entered a prefix to the user has selected an autocomplete query). Based on changing from the first state to the second state, a positive or negative reward is generated. Furthermore, based on the reward, the parameters (e.g., the weights of the neural network) are updated to increase the probability that the target language model 304 generates an autocomplete query that results in a maximum reward. This process of updating the policy can repeat until there is no discernible improvement in the performance of the target language model 304.

The reinforcement learning trainer 306 can further include a ranker 330 for ranking one or more autocomplete queries generated by the target language model. The ranker 330 can generate instructions as to an order as to one or more autocomplete queries are presented on a GUI. For example, if the prefix 308 is "Acme car" and a first autocomplete query is "Acme car accessory" and a second autocomplete query is "Acme car floormat" The ranker 330 can generate an order as to how "Acme car accessory" and "Acme car floormat" is displayed. For example, "Acme car accessory" is displayed above "Acme car floormat" or vice versa. The ranker 330 can make the determination based on various parameters. For example, the ranker 330 can determine a score for each generated autocomplete query. The score can be based on information included in the history log. For example, the score can be based on a rate of use of an autocomplete query. For example, if the generated autocomplete query is "Acme car accessory," the score can be based on the number of times that "Acme car accessory" has been used by users in the past.

FIG. 4 illustrates an example prompt 400 for deep retrieval reinforcement learning, according to embodiments of the present disclosure. As illustrated, the prompt 400 is written as a narrative and provides three examples and instructions. Each of the example samples provide a prefix and a desired autocomplete query. For example, sample 1 indicates that the prefix is "tablet" and the desired autocomplete query is "tablet 9.7 inch case." The instructions below the samples are designed to trigger a response from the language model using the samples as a basis for formulating the autocomplete query. The prefix/autocomplete query pairs provided in the prompt can be designed to assist the language model to generate an autocomplete response associated with a maximum reward. FIG. 4 is an example of an in-content learning prompt that includes a small set of examples that are provided to a language model along with an instruction to perform a task.

FIG. 5 illustrates an example prompt 500 for deep retrieval reinforcement learning, according to embodiments of the present disclosure. As illustrated, the prompt 500 is written as a narrative and provides past auto complete queries and an instruction to generate an autocomplete query for the prefix nik. As seen, even though the full word (e.g., "Nikalt") has not been typed by the user, the language model can be trained using the prompt to generate autocomplete query related to a camera using the first three letters (e.g., nik) of Nikalt).

Figure 6:
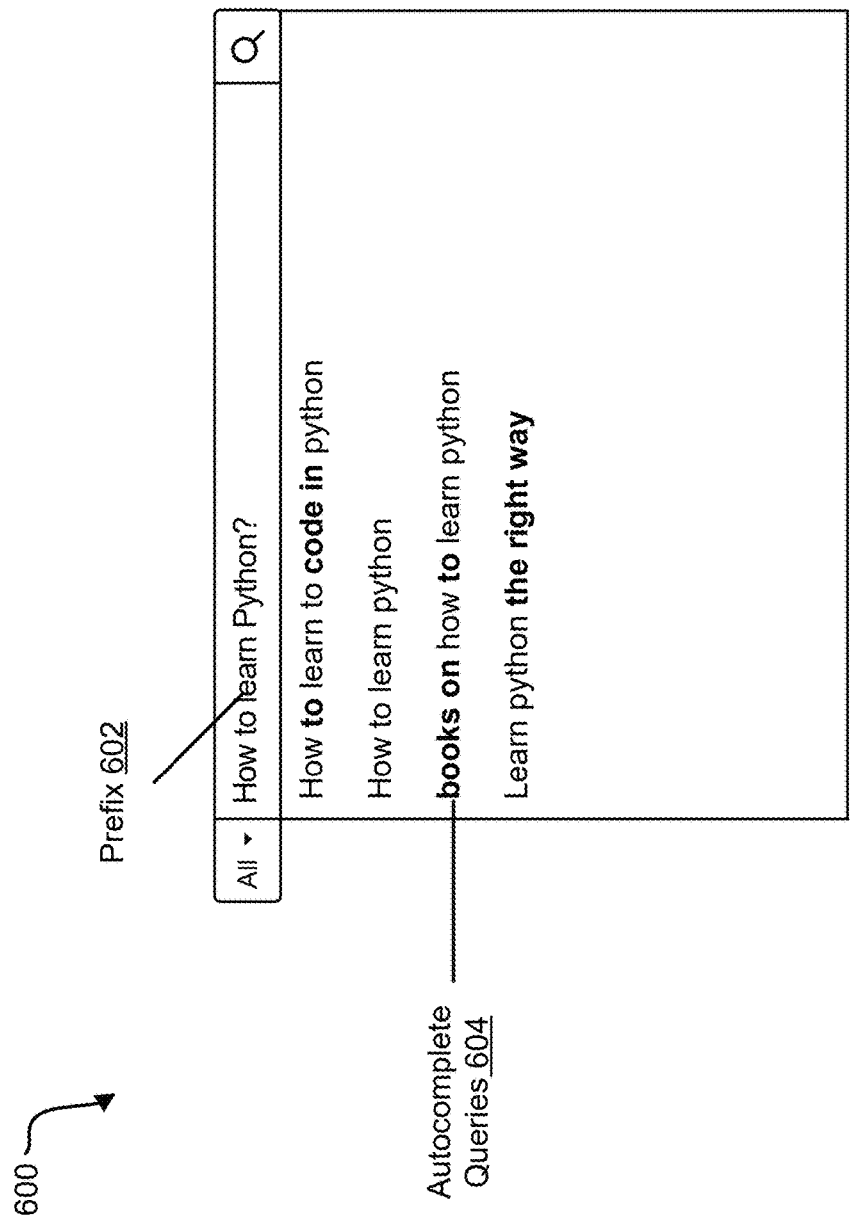
FIG. 6 illustrates an example autocomplete query result generated using lexical matching, according to embodiments of the present disclosure.
Figure 7:
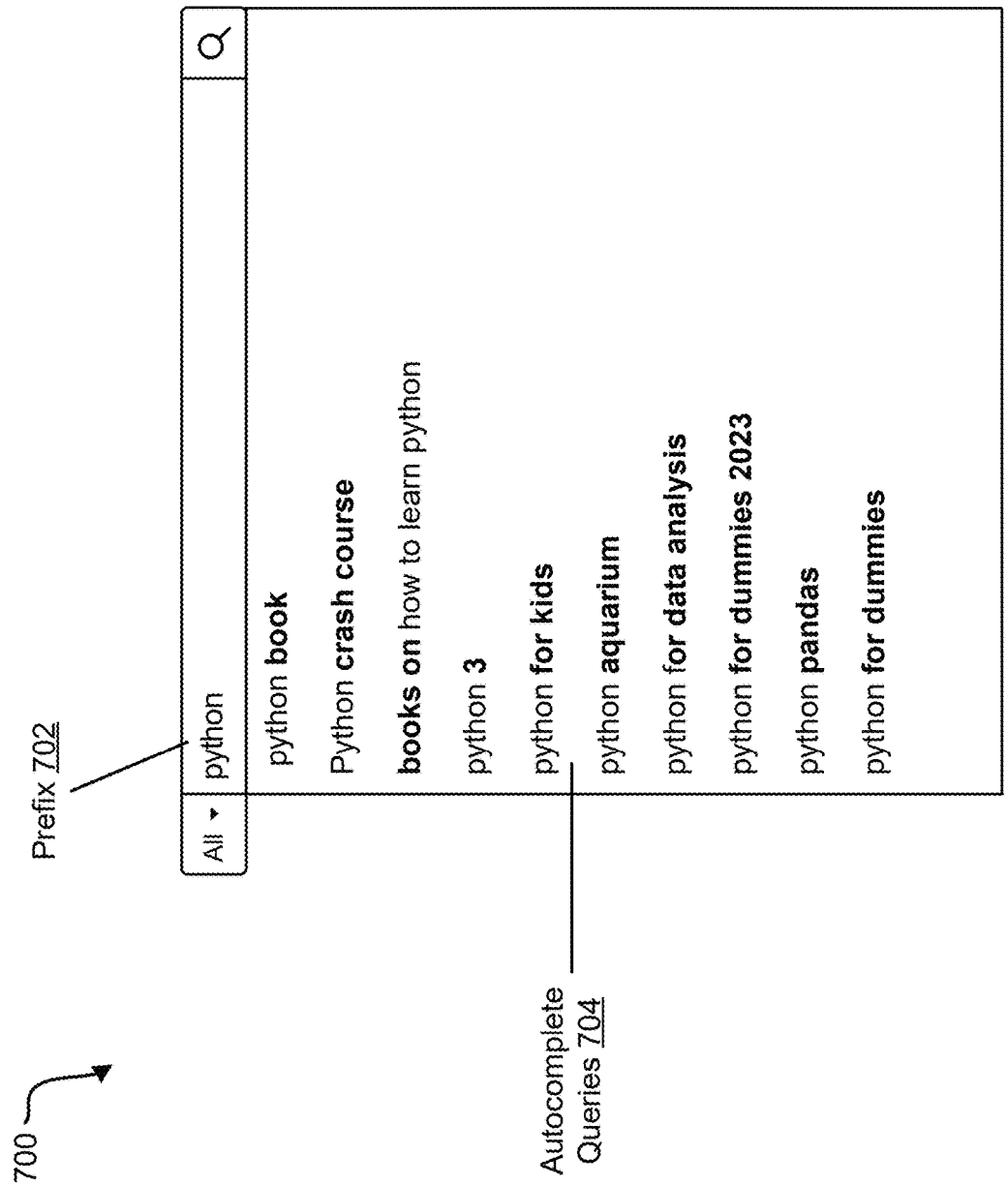
FIG. 7 illustrates an example autocomplete query result generated using a generative model, according to embodiments of the present disclosure.

FIGS. 6 and 7 are provided to demonstrate a difference between autocomplete queries generated using lexical matching and a generative model. FIG. 6 illustrates an example autocomplete query result generated using lexical matching, according to embodiments of the present disclosure. As illustrated, the prefix 602 "How to learn Python" has been entered into a search bar. A conventional computing system has used a lexical token matching technique to generate four autocomplete queries 604.

FIG. 7 illustrates an example autocomplete query result generated using a generative model, according to embodiments of the present disclosure. As illustrated, the prefix 702 "python" has been entered into a search bar. The herein described computing system has used a language model to generate ten responses. It can further be seen that even though the intent of the prefix 702 is not clear, the language model can generate various autocomplete queries 704. For example, it is not initially clear whether python refers to a snake, a computing language, or what aspect of python that the user is seeking an item. The language model can generate a more robust set of autocomplete queries 704 than a conventional lexical token matching technique.

Figure 8:
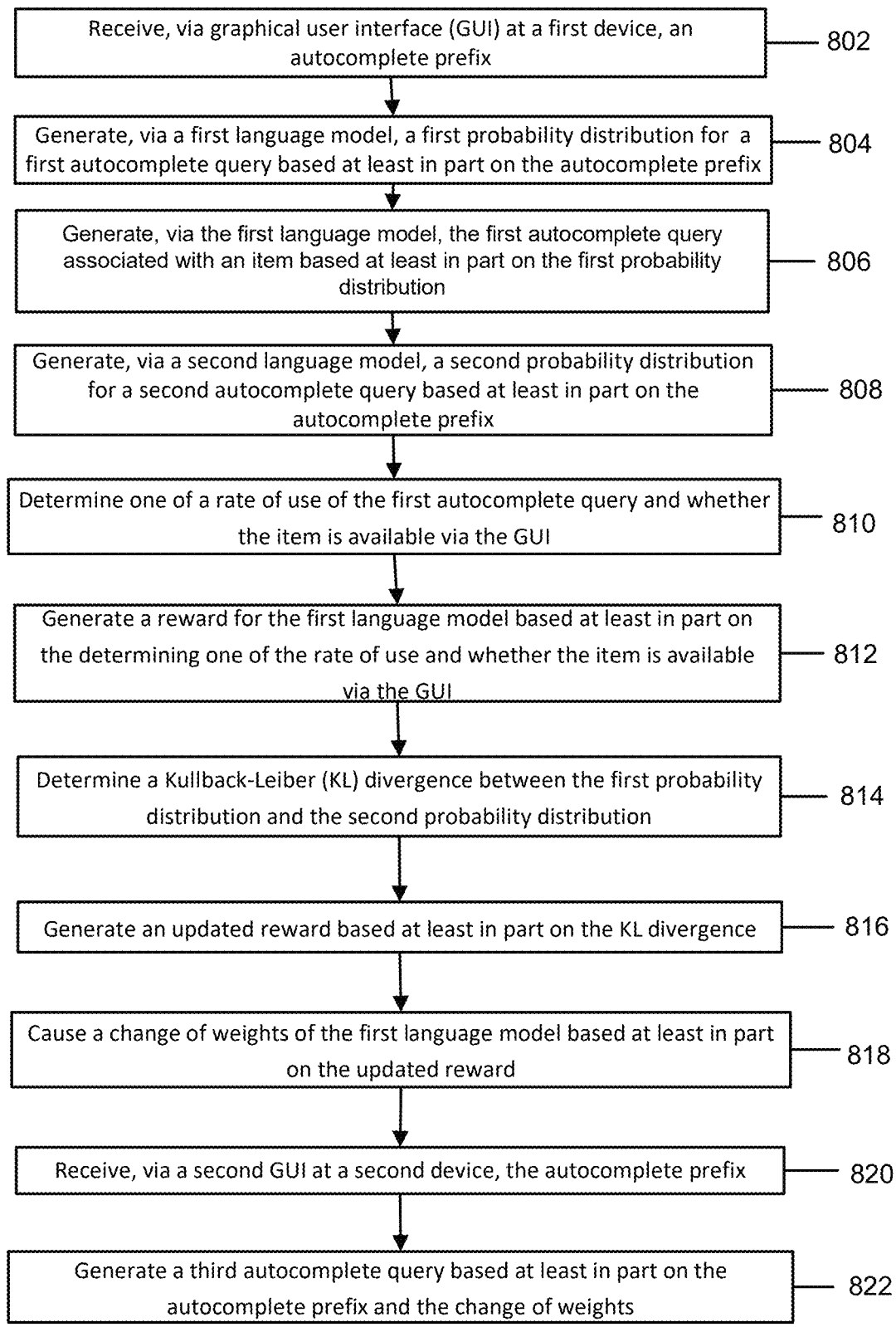
FIG. 8 illustrates an example process flow for generative model based autocomplete query generation, according to embodiments of the present disclosure.

FIG. 8 illustrates an example process flow 800 for generative model based autocomplete query generation, according to embodiments of the present disclosure. Some or all of the process 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 802, the method can include a computing system receiving, via graphical user interface (GUI) at a first device, an autocomplete prefix. For example, a user can use a user device to access a website on the internet. The website may provide a GUI that includes search features for search for an item available via the GUI.

At 804, the method can include the computing system generating, via a first language model, a first probability distribution for a first autocomplete query based at least in part on the autocomplete prefix. The probability distribution can include probabilities for candidate tokens (e.g., words or phrases) to be included in an autocomplete query. In the instances, that the autocomplete query includes multiple tokens, the probability distribution can be based on a previous token.

At 806, the method can include the computing system generating via the first language model the first autocomplete query associated with an item based at least in part on the prefix and the first probability distribution. For example, the language model can select a token based at least in part on a probability from the probability distribution, where the higher the probability the more likely the token is to be selected.

At 808, the method can include the computing system generating, via a second probability distribution for a second autocomplete query based at least in part on the first prefix. For example, the first language model can be a target language model and the second language model can be a reference language model. The second probability distribution can provide ground truth data to compare against the first probability distribution.

At 808, the method can include the computing system determining one of a rate of use (e.g., popularity) and whether the item is available via the GUI. For example, the computing system can access a historical log and determine a rate of use (e.g., how popular the autocomplete query is for all users via the GUI) and whether the item is available via the GUI.

At 810, the method can include the computing system generating a reward for the first language model based at least in part on the determining one of the rate of use of the first autocomplete query and whether the item is available via the GUI. The reward can be a positive reward or a negative reward. For example, if the rate of use of the first autocomplete query exceeds the threshold, the computing system can be more likely to assign a positive reward. If, however, the popularity of the first autocomplete query does not exceed the threshold, the computing system can be likely to assign a lesser reward.

For example, the computing system can compare the rate of use to a threshold rate of use and determine whether the first autocomplete query exceeds the threshold rate of use. The computing system can also determine which items are available via the GUI and whether the first autocomplete query is associated with one or more of those items. Furthermore, whether the item exceeds the threshold rate of use and whether the item is available via the GUI can be considered non-user based inputs. It should be appreciated that the computing system can consider other non-user based inputs (e.g., a autocomplete query trend, an item popularity or other appropriate non-used based input).

At 812, the method can include the computing system generating, via a second language model, a second probability distribution for a second autocomplete response based at least in part on the prefix. The first language model can be a target language model to be trained and the second language model can be a reference language model used to generate a ground truth.

At 814, the method can include the computing system determining a Kullback-Leiber (KL) divergence between the first probability distribution and the second probability distribution. The KL divergence can be used to determine a relative entropy between the first probability distribution and the second probability distribution. In other words, how far does the first probability distribution drift from the ground truth.

At 816, the method can include the computing system generating an updated reward based at least in part on the KL divergence. The computing system can compare the KL divergence to a threshold divergence. If the KL divergence exceeds the threshold difference the computing system can determine to lower a reward determined by the reward model (e.g., a KL penalty). If, however, the KL divergence does not exceed the threshold difference the computing system can determine to raise a reward determined by the reward model.

At 818, the method can include the computing system causing a change of weights of the first language model based at least in part on the updated reward. The computing system can use proximal policy optimization (PPO) techniques to change the weights of the first language model based the KL divergence.

At 820, the method can include the computing system receiving, via a second GUI at a second device, the autocomplete prefix. For example, another user can use another user device to access the website on the internet. The website may still provide a GUI that includes search features for search for an item available via the GUI.

At 822, the method can include the computing system generating a third autocomplete query based at least in part on the first autocomplete prefix and the change of weights.

Figure 9:
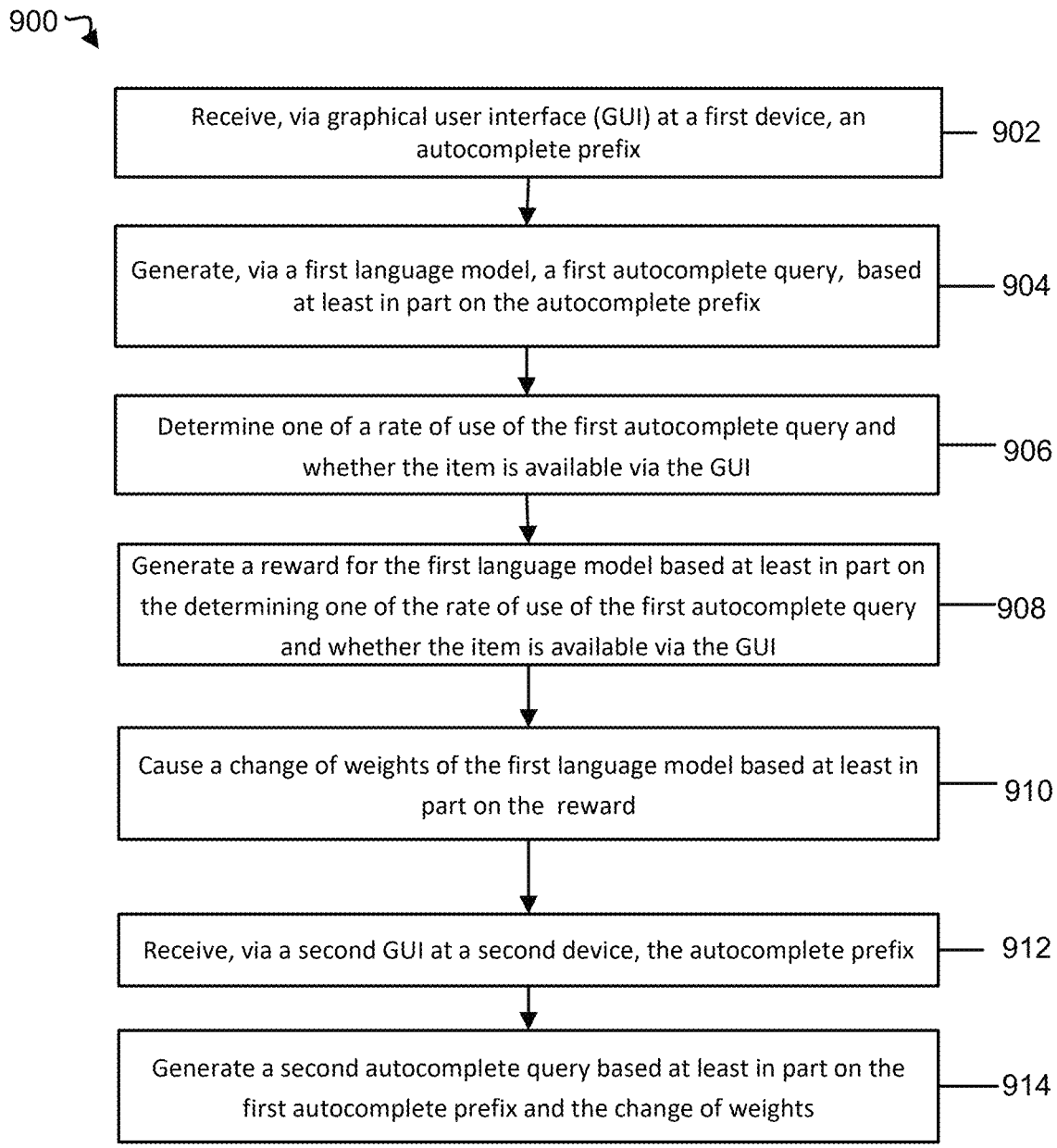
FIG. 9 illustrates an example process flow for generative model based autocomplete query generation, according to embodiments of the present disclosure.

FIG. 9 illustrates an example process flow 900 for generative model based autocomplete query generation, according to embodiments of the present disclosure. At 902, the method can include a computing system receiving, via GUI at a first device, an autocomplete prefix. For example, a user can use a user device to access a website on the internet. The website may provide a GUI that includes search features for search for an item available via the GUI.

At 904, the method can include the computing system generating, via the first language model, the first autocomplete query associated with an item based at least in part on the autocomplete prefix. For example, the language model can select a token based at least in part on a probability of the token, where the higher the probability the more likely the token is to be selected.

At 906, the method can include the computing system determining one a rate of use of the first autocomplete query or whether the item is available via the GUI. The computing system can further determine whether the first autocomplete query exceeds a threshold rate of use and whether the item is available via the GUI can be considered non-user based inputs. The computing system can also determine which items are available via the GUI and whether the first autocomplete query is associated with one or more of those items.

At 908, the method can include the computing system generating a reward for the first language model based at least in part on the rate of use of the first autocomplete query and whether the item is available via the GUI. The reward can be a positive reward or a negative reward. For example, if the rate of use of the first autocomplete query exceeds the threshold, the computing system can be more likely to assign a positive reward. If, however, the rate of use of the first autocomplete query does not exceed the threshold, the computing system can be likely to assign a lesser reward.

At 910, the method can include the computing system causing a change of weights of the first language model based at least in part on the updated reward. The computing system can use proximal policy optimization (PPO) techniques to change the weights of the first language model.

At 912, the method can include the computing system receiving, via a second GUI at a second device, the autocomplete prefix. For example, another user can use another user device to access the website on the internet. The website may still provide a GUI that includes search features for search for an item available via the GUI.

At 914, the method can include the computing system generating a second autocomplete query based at least in part on the first autocomplete prefix and the change of weights.

Figure 10:
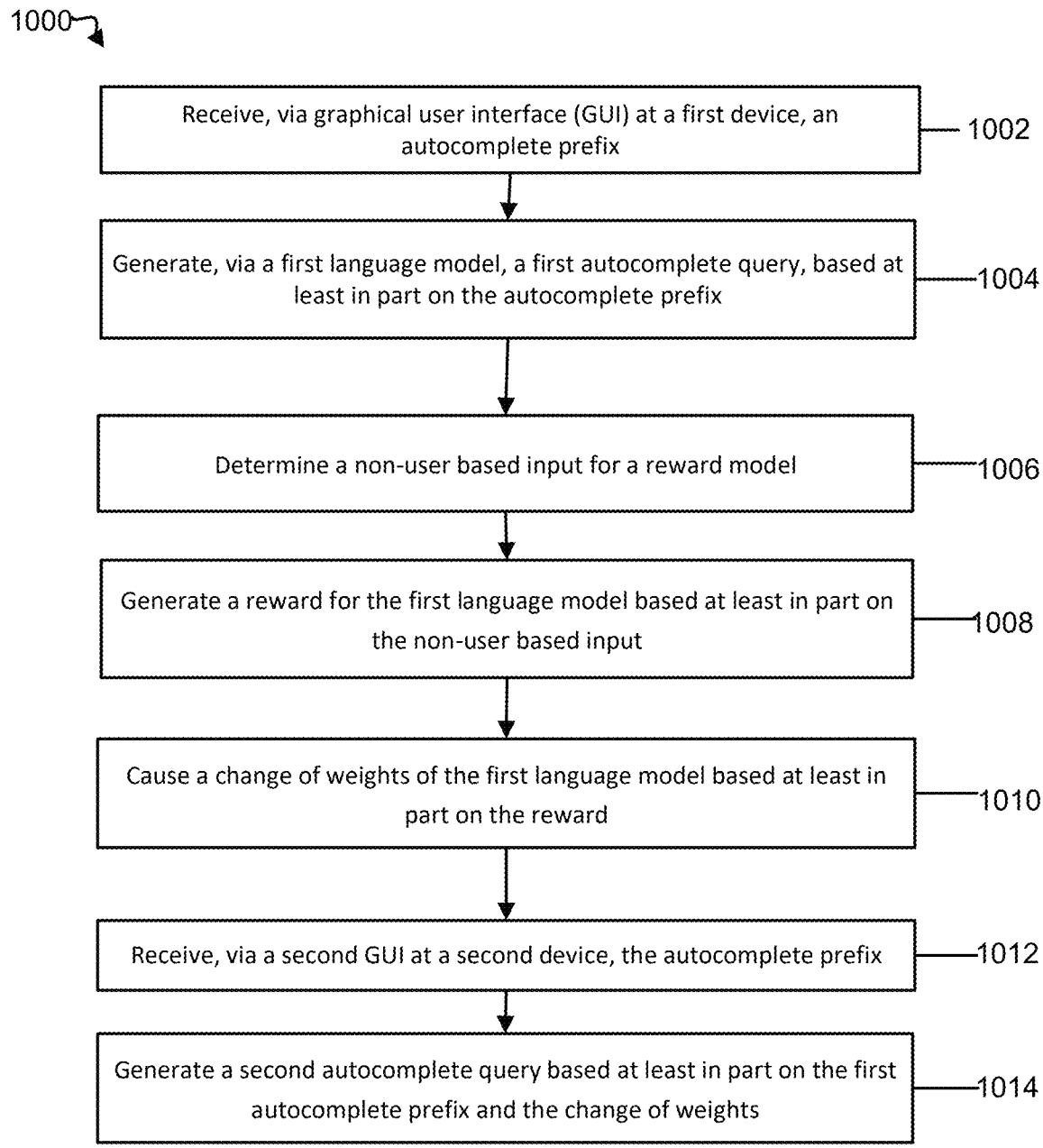
FIG. 10 illustrates an example process flow for generative model based autocomplete query generation, according to embodiments of the present disclosure.

FIG. 10 illustrates an example process flow for generative model based autocomplete query generation, according to embodiments of the present disclosure. At 1002, the method can include a computing system receiving, via GUI at a first device, an autocomplete prefix. For example, a user can use a user device to access a website on the internet. The website may provide a GUI that includes search features for search for an item available via the GUI.

At 1004, the method can include the computing system generating, via the first language model, the first autocomplete query associated with an item based at least in part on the autocomplete prefix. For example, the language model can select a token based at least in part on a probability of the token, where the higher the probability the more likely the token is to be selected.

At 1006, the method can include the computing system determining a non-user based input for a reward model. The non-user based input can be based on a rate of use of the autocomplete query or whether the item is available via the GUI. For example, if the rate of use of the first autocomplete query exceeds the threshold, the computing system can be more likely to assign a positive reward. If, however, the rate of use of the first autocomplete query does not exceed the threshold, the computing system can be likely to assign a lesser reward.

At 1008, the method can include the computing system generating, via the rewards model, a reward for the first language model based at least in part on the non-user based input.

At 1010, the method can include the computing system causing a change of weights of the first language model based at least in part on the updated reward. The computing system can use proximal policy optimization (PPO) techniques to change the weights of the first language model.

At 1012, the method can include the computing system receiving, via a second GUI at a second device, the autocomplete prefix. For example, another user can use another user device to access the website on the internet. The website may still provide a GUI that includes search features for search for an item available via the GUI.

At 1014, the method can include the computing system generating a second autocomplete query based at least in part on the first autocomplete prefix and the change of weights.

Figure 11:
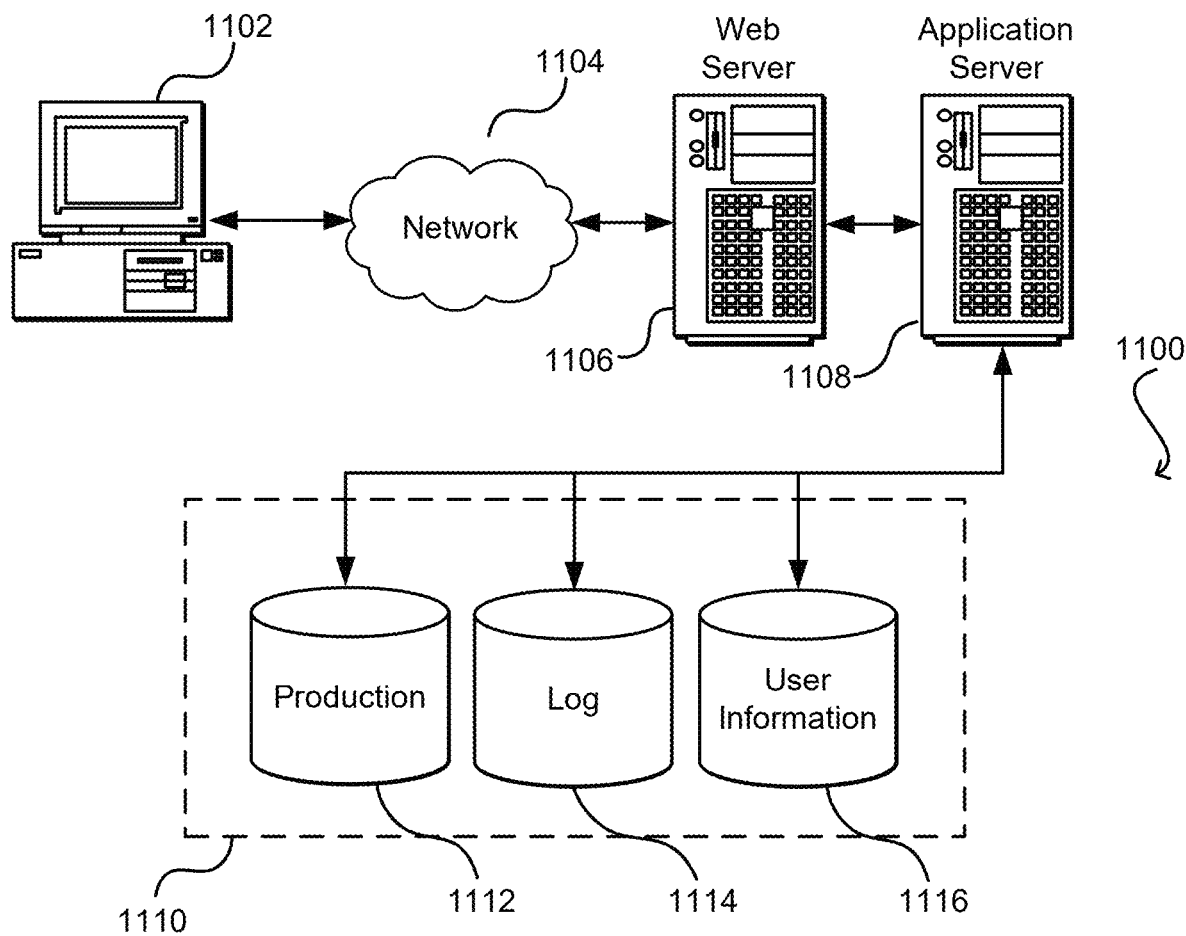
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 1102. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 1106 or other servers over the network 1104 or other networks.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a computing system, the method comprising:
    receiving, via graphical user interface (GUI) at a first device, an autocomplete prefix;
    generating, via a first language model, a first probability distribution for a first autocomplete query based at least in part on the autocomplete prefix;
    generating, via the first language model, the first autocomplete query associated with an item based at least in part on the autocomplete prefix and the first probability distribution;
    generating via a second language model, a second probability distribution for a second autocomplete query based at least in part on the autocomplete prefix;

determining one of a rate of use of the first autocomplete query or whether the item is available via the GUI;

generating a reward for the first language model based at least in part on the determining one of the rate of use of the first autocomplete query or whether the item is available via the GUI;

determining a Kullback-Leiber (KL) divergence between the first probability distribution and the second probability distribution;

generating an updated reward based at least in part on the KL divergence;

causing a change of weights of the first language model based at least in part on the updated reward;

receiving, via a second GUI at a second device, the autocomplete prefix; and generating, via the first language model, a third autocomplete query based at least in part on the first autocomplete prefix and the change of weights.

2. The method of claim 1, wherein the method further comprises:

transmitting the first autocomplete query to be displayed on the GUI;

receiving, via the GUI, a state associated with the first autocomplete query, wherein the reward is generated based at least in part on the state.

3. The method of claim 1, wherein the method further comprises:

receiving a prompt comprising a fourth autocomplete query and instructions to generate the first autocomplete query, wherein the first autocomplete query is generated, by at least in part on using the first language model, based at least in part on a combination of the first autocomplete prefix and the prompt.

4. A computing system comprising:

one or more processors; and one or more non-transitory computer-readable media having stored thereon a sequence of instructions, when executed, cause the one or more processors to:

receive, via graphical user interface (GUI) at a first device, a first autocomplete prefix;

generate, via a first language model, a first autocomplete query associated with an item based at least in part on the first autocomplete prefix;

determine one of a rate of use of the first autocomplete query or whether the item is available via the GUI;

generate a reward for the first language model based at least in part on the rate of use and whether the item is available via the GUI;

cause a change of weights of the first language model based at least in part on the reward;

receive, via a second GUI at a second device, the first autocomplete prefix; and generate, via the first language model, a second autocomplete query based at least in part on the first autocomplete prefix and the change of weights.

5. The computing system of claim 4, wherein the sequence of instructions, when executed, further cause the one or more processors to:

generate, via the first language model, a first probability distribution for a first autocomplete query based at least in part on the autocomplete prefix;

generate, via a second language model, a second probability distribution for a second autocomplete response based at least in part on the prefix;

determine a relative entropy between the first probability distribution and the second probability distribution; and generate an updated reward based at least in part on the relative entropy.

6. The computing system of claim 5, wherein the relative entropy comprises a Kullback-Leiber (KL) divergence, and wherein the sequence of instructions, when executed, further cause the one or more processors to:

compare the KL divergence to a threshold KL divergence; and determine whether the KL divergence exceeds the threshold KL divergence based at least in part on the comparison, wherein the reward is updated based at least in part on the whether the KL divergence exceeds the threshold KL divergence.

7. The computing system of claim 6, wherein the sequence of instructions, when executed, further cause the one or more processors to:

determine that the KL divergence exceeds the threshold KL divergence, wherein the updated reward is less than the reward based at least in part on the KL divergence exceeding the threshold KL divergence, and wherein the weights of the first language model are changed based at least in part on the updated reward.

8. The computing system of claim 6, wherein the sequence of instructions, when executed, further cause the one or more processors to:

determine that the KL divergence is less than the threshold KL divergence, wherein the updated reward is greater than the reward based at least in part on the KL divergence being less than the threshold KL divergence, and wherein the weights of the first language model are changed based at least in part on the updated reward.

9. The computing system of claim 4, wherein the first autocomplete prefix is received during a session, and wherein the sequence of instructions, when executed, further cause the one or more processors to:

receive, via the first GUI, a state associated with the first autocomplete query;

receive, via the first GUI, a second autocomplete prefix during the session; and generate a third autocomplete query based at least in part on the second autocomplete prefix and the state.

10. The computing system of claim 9, wherein the state indicates that a user selected the first autocomplete query, and wherein the sequence of instructions, when executed, further cause the one or more processors to:

determine a semantic relationship between the first autocomplete prefix and the first autocomplete query wherein the third autocomplete query is generated to have a same semantic relationship.

11. The computing system of claim 9, wherein the state indicates that a user did not select the first autocomplete query, and wherein the sequence of instructions, when executed, further cause the one or more processors to:

determine a semantic relationship between the first autocomplete prefix and the first autocomplete query wherein the third autocomplete query is generated to have a different semantic relationship.

12. The computing system of claim 4, wherein the first autocomplete prefix is received during a session, and wherein the sequence of instructions, when executed, further cause the one or more processors to:

transmit the first autocomplete query to be displayed on the GUI;

receive, via the GUI, a state associated with the first autocomplete query, wherein the state indicates a user selected the first autocomplete query;

determine that the first autocomplete query exceeds a threshold rate of use; and determine that the item is available via the GUI, wherein the reward is a positive reward based at least in part on the user selecting the first autocomplete query, the first autocomplete query exceeding a threshold rate of use, and the item being available via the GUI.

13. The computing system of claim 4, wherein the sequence of instructions, when executed, further cause the one or more processors to:

transmit the first autocomplete query to be displayed on the GUI; and receive, via the GUI, a state associated with the first autocomplete query, wherein the state indicates whether a user selected the first autocomplete query, wherein the reward is generated based at least in part on a combination of the state, whether the first autocomplete query exceeds a threshold rate of use, and whether the item is available via the GUI.

14. The computing system of claim 4, wherein the sequence of instructions, when executed, further cause the one or more processors to:

transmit the first autocomplete query to be displayed on the GUI; and receive, via the GUI, a state associated with the first autocomplete query, wherein the state indicates whether a user selected the first autocomplete query, wherein the reward is generated based at least in part on a combination of the state, whether the first autocomplete query exceeds a threshold rate of use, and whether the item is available via the GUI.

15. The computing system of claim 4, wherein the sequence of instructions, when executed, further cause the one or more processors to:

receive a prompt comprising a third autocomplete query and instructions to generate the first autocomplete query; and determine a semantic relationship between the third autocomplete query and the first autocomplete prefix, wherein the first autocomplete query is generated based at least in part on a combination of the prefix and the prompt, and wherein the third autocomplete query is associated with a positive reward.

16. The computing system of claim 4, wherein the sequence of instructions, when executed, further cause the one or more processors to:

receive a prompt comprising a third autocomplete query, a second autocomplete prefix associated with the third autocomplete query, and instructions to generate the first autocomplete query; and determine a semantic relationship between the third autocomplete query and the second autocomplete prefix, wherein the first autocomplete query is generated based at least in part on the first autocomplete prefix and the semantic relationship.

17. One or more non-transitory computer-readable media having stored thereon a sequence of instructions, when executed, cause one or more processors to:

receive, via graphical user interface (GUI) at a first device, a first autocomplete prefix;

generate, via a first language model, a first autocomplete query associated with an item based at least in part on the first autocomplete prefix;

determine a non-user based input for a reward model;

generate, via the reward model, a reward for the first language model based at least in part on the non-user based input;

cause a change of weights of the first language model based at least in part on the reward;

receive, via a second GUI at a second device, the first autocomplete prefix; and generate, via the first language model, a second autocomplete query based at least in part on the first autocomplete prefix and the change of weights.

18. The one or more non-transitory computer-readable media of claim 17, wherein the sequence of instructions, when executed, further cause the one or more processors to:

access information associated with a rate of use of the first autocomplete query; and compare the rate of use to a threshold rate of use, wherein the reward is based at least in part on the comparison, and wherein the non-user based input comprises information as to whether the rate of use exceeds the threshold rate of use.

19. The one or more non-transitory computer-readable media of claim 17, wherein the sequence of instructions, when executed, further cause the one or more processors to:

access information associated with a plurality of items available via the GUI; and determine whether the plurality of items comprises the item, wherein the reward is based at least in part on whether the plurality of items comprises the item, and wherein the non-user based input comprises information as to whether the plurality of items comprises the item.

20. The one or more non-transitory computer-readable media of claim 17, wherein the sequence of instructions, when executed, further cause the one or more processors to:

transmit the first autocomplete query to be displayed on the GUI; and receive, via the GUI, a state associated with the first autocomplete query, wherein the reward is generated based at least in part on a combination of the non-user based input and the state.

* * * * *